Figure 1:
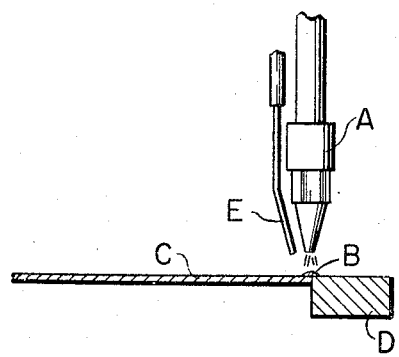

Dec. 2, 1958      T. B. PHILIP      2,862,294

JOINING OF METALS

Filed Nov. 5, 1954

*INVENTOR.*
Thomas B. Philip

BY

ATTORNEY

United States Patent Office 2,862,294
Patented Dec. 2, 1958

2,862,294

JOINING OF METALS

Thomas Bruce Philip, Effingham, England, assignor to The Distillers Company Limited, Edinburgh, Scotland, a British company Application November 5, 1954, Serial No. 467,179

Claims priority, application Great Britain November 17, 1953

5 Claims. (Cl. 29—487)

This invention relates to improvements in or relating to the joining of metals by a metallic fusion process, by which is meant throughout this specification processes in which any metal is brought into the fused state during the process of effecting the join.

One of the difficulties in joining sheet metal by a metallic fusion process, particularly fusion welding by gas or electric arc, is the spread of heat from the weld through the materials being joined. This difficulty is particulary serious in the welding of a thin sheet to material of heavier section and in the welding together of two thin sheets. This spread of heat into the thin sheet causes a considerable warping and distortion adjacent to the weld. In the past attempts have been made to prevent this spread of heat by maintaining an area of the thin sheet, adjacent to the weld to be made, in contact with a large block of a metal which is a good conductor of heat, such as copper. This method of preventing the spread of heat from the weld is often awkward when the sheets to be joined are flat and is almost impossible when sheets having a curvature in more than one plane are to be joined. It is an object of the present invention to avoid or reduce these difficulties.

Accordingly there is provided a process for joining metals by a metallic fusion process wherein an area of the metal adjacent to that being fused is cooled by a stream of carbon dioxide in the form of gas, liquid or snow, or any combination of these states, thereby reducing the spread of heat from the heated area into the surrounding metal.

The stream of carbon dioxide can be delivered from one or more orifices, such as jets or capillary tubes, of internal diameter up to about 30 thousandths of an inch which may conveniently be carried on the welding appliance. Instead of plain jets or capillary tubes an orifice shaped like that of a fish tail gas burner can be used. The stream of carbon dioxide thus delivered forms a cooled barrier between the weld and the remainder of the material being welded. In the case where two thin sheets of material are being welded together streams of carbon dioxide may be delivered on either side of the weld. Furthermore the streams of carbon dioxide may impinge on the same side of the material being welded as the weld itself or on the opposite side. In certain cases it may be advantageous to apply carbon dioxide to both sides of the material. In hand welding the carbon dioxide orifice may either be attached to the welding appliance or may be handled independently, while in automatic welding the orifice is preferably attached to the welding appliance in those cases where the welding appliance itself moves while the material being welded remains stationary.

The carbon dioxide supplied to the orifice may be cooled isobarically during its passage from the supply reservoir to the delivery point whereby a greater proportion of the carbon dioxide emerging from the orifice is in the liquid and solid forms. Such cooling is particularly important in welding shops where the ambient temperature is high since carbon dioxide has a critical temperature of only 31° C. and cannot therefore exist in the liquid state in temperatures above this. Such isobaric cooling of the carbon dioxide is described in relation to the use of carbon dioxide as a coolant in cutting operations, such as lathe turning, in copending application U. S. Ser. No. 460,724.

The carbon dioxide may be supplied to the orifice from a bulk storage tank or from one or more portable cylinders. In the latter case the cylinders may conveniently be carried on a trolley incorporating an arrangement whereby empty cylinders may be exchanged for full ones without disturbing the continuity of supply. The trolley may also conveniently carry a refrigerator for cooling the carbon dioxide as described above.

In the accompanying drawings Figure 1 shows a welding torch A forming a weld B between a thin metallic sheet C and a bar D. A capillary tube E delivering the stream of carbon dioxide cools the sheet C alongside the weld, thereby reducing the spread of heat into the sheet.

Figure 2:
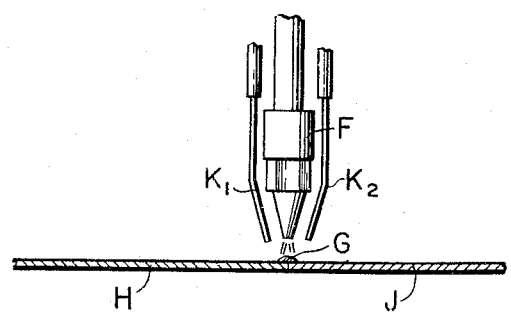

Figure 2 shows a welding torch F forming a weld G between two thin sheets of metal H, J. Capillary tubes $K_1$ and $K_2$ eject streams of carbon dioxide on either side of the weld, thereby reducing the spread of heat.

I claim:

1. A process for joining metals, at least one of which is in the form of a thin sheet distortable by heat conducted from the joint, by fusion welding which comprises moving a fusion welding means along the joint between said metals to effect welding thereof and simultaneously cooling an area adjacent to that being welded by delivering at least to said thin sheet a stream of carbon dioxide from an orifice to which liquid carbon dioxide is supplied to form a layer of carbon dioxide snow on said thin sheet adjacent the joint, whereby cooling is effected due to sublimation of said snow.

2. A process according to claim 1, in which both metals being joined by fusion welding are in the form of thin sheets.

3. A process according to claim 1, in which only one of the metals being joined by fusion welding is in the form of a thin sheet and the other metal is in the form of a metallic bar.

4. A process according to claim 1, in which a stream of carbon dioxide is delivered to each of the metals being joined by fusion welding at an area adjacent the joint.

5. A process according to claim 1, in which the carbon dioxide is delivered in the form of a jet of capillary dimensions.

References Cited in the file of this patent

UNITED STATES PATENTS

| | | |
|---|---|---|
| 1,969,840 | Goddard | Aug. 14, 1934 |
| 2,280,150 | Hasse et al. | Apr. 21, 1942 |
| 2,455,309 | Levin | Nov. 30, 1948 |
| 2,497,629 | Rieppel | Feb. 14, 1950 |